UNITED STATES PATENT OFFICE.

HEINRICH SPECKETER, OF GRIESHEIM-ON-THE-MAIN, GERMANY.

PROCESS OF PRODUCING PURE ZINC.

1,231,083.     Specification of Letters Patent.     Patented June 26, 1917.

No Drawing.     Application filed September 2, 1913. Serial No. 787,667.

*To all whom it may concern:*

Be it known that I, Dr. HEINRICH SPECKETER, chemist, a subject of the German Emperor, and residing at 32 Kaiserstrasse, Griesheim-on-the-Main, Germany, have invented certain new and useful Improvements in Processes of Producing Pure Zinc, of which the following is a specification.

The present invention relates to a process for the preliminary treatment of zinkiferous material usually employed for zinc extraction (such as zinc ores, zinc oxid, flue-dust, zinc ash, zinc dust, furnace residues, etc.) for the production of pure zinc. The invention aims at removing such metals and elements of the zinkiferous substances as are liable to pass into the zinc and to thus form impurities thereof or otherwise deteriorate it. Elements to be removed would be, for instance, the metals cadmium, etc., and different compounds, such as carbonates, sulfates, chlorids, and the like. These elements may be separately recovered, and the compounds may also be recovered, or, if this is not practicable, they may be destroyed.

Heretofore, zinc has been recovered either by complex processes involved in the reduction of the more easily reducible oxids and consequent removal of the corresponding metals in a series of successive and troublesome operations, or by a distillation process wherein the zinc ores admixed with coal were heated, without special preparation, (apart from preliminary roasting of zinc blende) in muffles or tubes for eliminating the zinc, whereby the zinc has always been obtained with some percentage of impurities such as cadmium, or the like, and has been partly in the form of zinc dust of inferior quality owing to the presence of detrimental volatile elements in the reduction gases.

The present invention has for its object a process whereby all of these detrimental elements will be preliminarily removed and,—so far as is possible and desirable, recovered and utilized; but the separation or removal by reduction and volatilization of the various metals which would tend to make the zinc impure will be effected in one operation, practically pure zinc remaining in the charge which can then be subjected to another operation for completely reducing it to pure metallic zinc.

For this purpose, according to the present invention, the zinkiferous materials, (especially zinc oxid, zinc ashes and the like) are, as a preliminary to the complete reduction of the zinc oxid, freed from their detrimental constituents, that is to say, from all volatile constituents other than zinc, by reduction and volatilization in a furnace, such as, for instance, a revolving furnace of the reverberatory type, having interior heating arrangements and with provisions for allowing at the same time a lively movement of the charge, each charge being separately subjected to the treatment. As a consequence of the movement to which the charge is subjected, a quite uniform heating of the mass is obtained, whereby the metallic impurities are reduced and volatilized, and are partly reburned to oxids. Moreover, the detrimental sulfates are reduced to sulfids, and the carbonates are destroyed. As soon as the temperature reaches about 950° C., the reduction of cadmium oxid commences. The volatile metal vapors thus obtained burn again in the furnace space to oxid, which then escapes in thick brown clouds and can be collected. In like manner, the reduction and volatilization of the other volatile elements is effected. At about 1000° C., the driving off of the cadmium is completed, and at about 1050° C., the first zinc flames appear. The heating is then stopped and the further treatment for obtaining the zinc of the charge as practically pure metal, which is kept hot, is proceeded with in an electric furnace or in any other convenient way, but this forms no part of the present invention.

A great advantage of the herein described process is that, being carried out in a separate operation from the subsequent treatment of the zinc in the charge, it can, for any given charge, be prolonged for a sufficient length of time to insure that the volatile constituents other than zinc have been entirely removed, so that the remaining charge will be purely zinkiferous and, moreover, the temperature can be kept at any desired or given level in all parts of the charge, whereby no undesirable constituents remain nor is any portion of the zinc lost.

What I claim is—

The method of producing zinc from zinkiferous materials, which consists in mixing the zinkiferous materials with carbonaceous material, then heating the mixture in the form of separate charges by direct heat and with agitation to such a degree as to cause the reduction of the impurities (such as, for instance, cadmium oxid and the like), together with volatilization of the reduction products thus freed, and then proceeding to the reduction of the zinc compounds.

In testimony whereof, I have hereunto signed my name at Frankfort-on-Main, this twentieth day of August, 1913.

HEINRICH SPECKETER.

Witnesses:
 JEAN GRUND,
 WILLIAM DAWSON, Jr.